Sept. 28, 1971     T. J. HITZEMANN     3,608,407
TOOL AND METHOD FOR PROCESSING PISTONS
Filed April 14, 1969
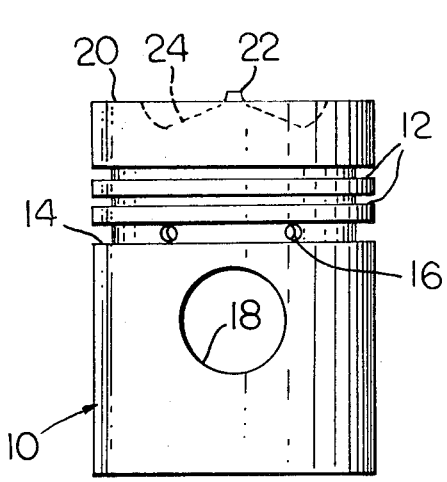
FIG. 1
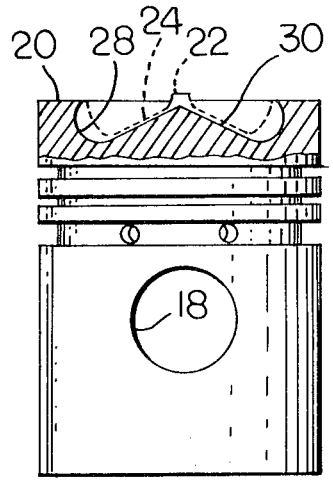
FIG. 2
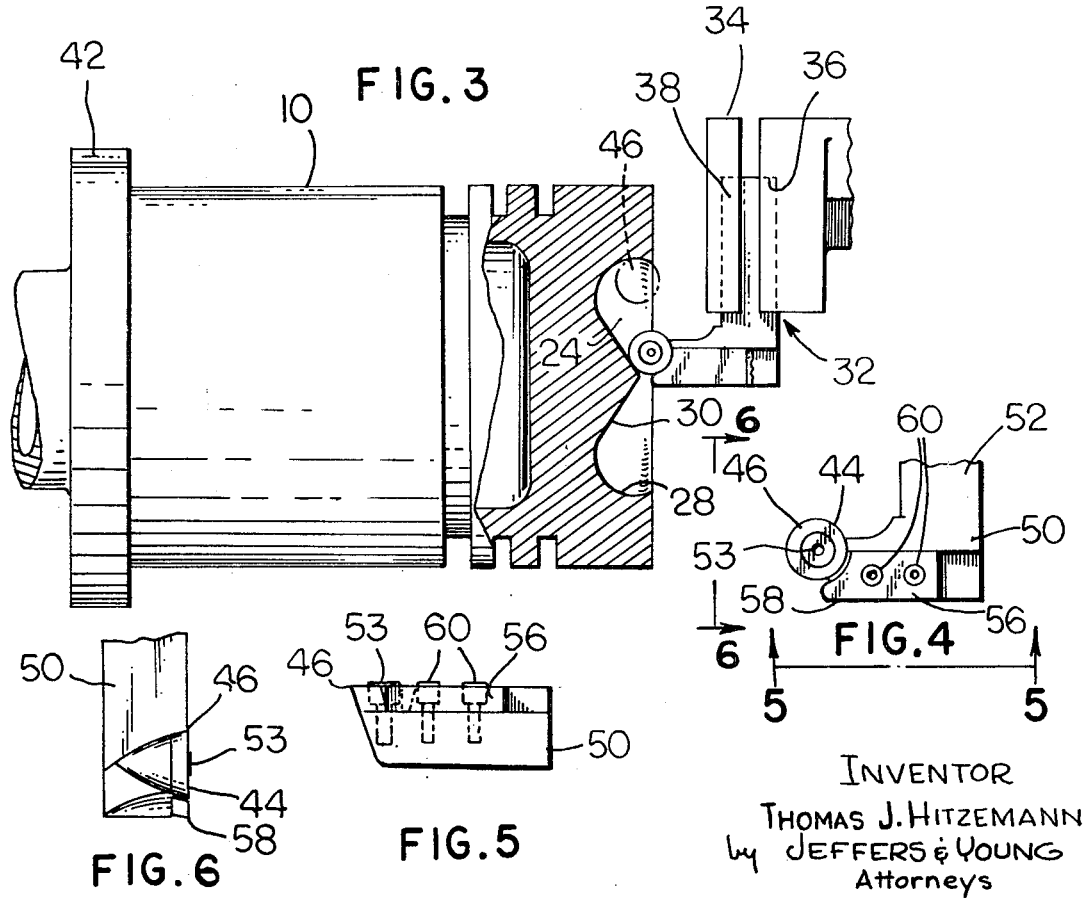
INVENTOR
THOMAS J. HITZEMANN
by JEFFERS & YOUNG
Attorneys United States Patent Office 3,608,407
Patented Sept. 28, 1971

3,608,407
TOOL AND METHOD FOR PROCESSING PISTONS
Thomas J. Hitzemann, 3319 Figel Ave.,
Fort Wayne, Ind. 46805
Filed Apr. 14, 1969, Ser. No. 815,824
Int. Cl. B23b 3/00; B26d 1/00
U.S. Cl. 82—1
2 Claims

ABSTRACT OF THE DISCLOSURE

In forming the working faces of pistons used in internal combustion engines, the profile of the piston face includes a concavely formed groove and a conical central portion. Previously, it was the practice to perform the machining operation in two steps, the first step was to remove a central boss on the piston and then a tool bit having a circular cutting edge was used to form the concave groove and finished profiling the conical central portion. In the present invention, I use a tool bit having polyfaced cutting edges in which there is combined with the circular cutting bit a second cutting bit which is transversely disposed with respect to the circular cutting bit and which removes sufficient metal in advance of the circular cutting bit so that the circular cutting bit can perform the finished machining operation forming the central conical portion on the piston. The forming operations take place simultaneously so that in this manner I can perform the entire machining operations in a singe step with a single tool.

BACKGROUND OF THE INVENTION

In internal combustion engines the working face of the piston within the combustion chamber is required to assume many different configurations for optimum operation of the engine. One of these configurations includes a concavely formed groove which constitutes a part of a recess in the face of the piston and a conical section at the central portion of the piston, also within the recess. Machining this particular configuration is a somewhat difficult problem because of the reverse curvatures in the profile of the configuration, and while it is not beyond the skill of the present art to produce such configurations, the operations generally require multiple machining steps with different tools and multiple handling of the piston. Pistons are items which are required in large scale because of the numerous internal combustion engines which are required in our present technology and to meet that demand pistons must be capable of large scale manufacture with minimum handling and a minimum number of tools for large scale manufacture of the piston in the amounts needed to fill the demands for the product. For reasons of economy, as well as to increase the speed of production, it is desirable to provide a finished product with a minimum number of machining operations and tools since each machining operation and tool requirement adds a factor of cost in the finished product.

OBJECTS OF THE INVENTION

One of the principal objects of the present invention is to provide in a single tool, a polyfaced tool bit having cutting surfaces which enable a single operation to configure a recess within the face of the piston having a profile with reversely directed curvatures.

It is a further object of the present invention to provide a new and improved method for forming a recess within the face of the piston which can perform in a single step an intricately profiled configuration including reversely directed profile surfaces.

It is a further object of the present invention to provide a polyfaced tool in which one tool bit portion is an arcuate cutting edge and the second tool bit portion has a straight edge disposed transversely to the arcuate edge so that multiple cutting operations can be simultaneously performed on the face of the piston forming an intricately profiled recess within the face of the piston and to finished dimensions.

Other objects and features of the present invention will become apparent from a consderation of the following description which refers to the accompanying drawings.

DRAWINGS

FIG. 1 is a side elevation view of a piston prior to the machining operation performed in the present invention;

FIG. 2 is a side elevation of the same piston as illustrated in FIG. 1 but with a portion thereof broken away to illustrate the machining operation, the dotted line illustrating the profile of the piston before machining occurs and the full line adjacent to it illustrating the finished dimension of the machined piston face obtained with the tool and process of the present invention;

FIG. 3 illustrates the piston and tool during the forming operation, the dotted line illustrating the tool in its initial position and the full line illustrating the tool at the terminal portion of the machining operation;

FIG. 4 is an enlarged detail view of the cutting bits, shown separately from the tool shank; and FIG. 5 is a detail view of the tool bit looking in the direction of the arrows 5—5 in FIG. 4, FIG. 6 is a detailed view on line 6—6, FIG. 4.

DETAILED DESCRIPTION OF THE INVENTION

Referring now to the drawings, in FIG. 1 there is illustrated a piston 10 having the usual O-ring seal grooves 12 and a further groove 14 with radial opening 16 through which lubricating oil is discharged to provide lubrication between the piston and cylinder bore (not shown).

The piston further includes an aperture 18 which receives a wrist pin connected to a piston rod or the like, also not shown. Piston 10 includes a face 20 with a central boss 22 and a recess 24. The finished profiile in the piston face is illustrated by the full-line configuration shown in FIG. 2 and includes a convexly shaped groove 28 and a conical section 30 disposed at the central portion of the face 20. In order to achieve this configuration it was previously the practice to first remove the boss 22 and then machine the face to its finished dimensions. In the present invention, I perform both operations simultaneously by means of the tool designated generally by reference numeral 32 (FIG. 3), the tool 32 being mounted through a fixture 34 within a pocket 36 which receives shank 38. The piston 10 is received within the working jaws of a rotatable chuck 42 which is power driven. Tool 32 includes a circular bit 44 having a cutting edge 46 with a negative angle rake of about 45 degrees with about 240 degrees around the circumference of the bit 44 being used for cutting action (FIG. 4). The bit 44 is secured in any suitable manner to transverse arm 50 of tool post 52 as for example by means of bolts 53 or the like. In conjunction with circular bit 44 is a second bit 56 having a straight cutting edge 58 and is secured to the arm 50 in any suitable manner as for example by bolts 60 or the like. The cutting edge 58 serves as the advance cutting surface for the circular cutting edge 46 of bit 44 as the tool advances toward the central portion of the piston (FIG. 3).

OPERATION

The piston 10 is chucked by adjustment of chuck jaws within a chuck so that it will rotate around a preferred axis of rotation, the point being that the machining does not necessarily have to occur at the geometric center line of the piston, and in fact it most frequently is not.

Tool 32 is mounted within fixture 34 and will automatically follow a prescribed line of movement in accordance with any desired programming system. At the start of profiling, the cutting edge 46 of bit 44 enters recess 24 (FIG. 3) and moves in a direction which produces a concave recess 28 (FIG. 2) after which time the tool advances toward the center of the piston. It should be noted that both the rake angle on the bit 46 and the tapered configuration of arm 50 permits rotation of the piston 10 without interference or contact by either the arm 50 or any portion of the bits 44, 56 except its cutting edges 46, 58.

As the tool 32 advances toward the center of the piston 10 the cutting edge 58 of bit 56 removes metal, and in doing so, prepares the surface for the finishing cutting operation performed by edge 46 of bit 44 which produces a finished configuration of the conical section 30. Boss 22 is removed in large part by cutting edge 58 and it is beyond the capability of bit 44 to do so unassisted by the bit 56. Whereas it was previously the practice to first remove the boss 22 to the extent that the bit 44 would be able to perform the finishing operation, a combined cutting action of bit 56 together with bit 44 makes it possible with a single tool and with a single machining operation to perform the complete machining in a single step.

Of course the present invention is not limited to any particular dimension or shape that can be made in the face of piston. For example, the precise dimensions and shape of the central conical section 30 can be varied and still come within the scope of the present invention. That is to say, the height of the cone, its location, pitch and so forth can be varied in accordance with design considerations and the tool and method which I proposed are well adapted thereto. I also intend to include within the scope of the present invention the formation of a totally flat recess and other such variations in accordance with the design requirement of the engine manufacturer.

What is accomplished in the present invention is the configuring of intricate profiles including reversely bent sections of the profile by means of a single tool which combines the cutting operations of polyfaced cutting tools.

Although the present invention has been illustrated and described in connection with a single example embodiment, it will be understood that this is illustrative of the invention and is by no means restrictive thereof. It is reasonably to be expected that those skilled in this art can make numerous revisions and adaptations and it is intended that such revisions and adaptations will be included within the scope of the following claims as equivalents of the invention.

What is claimed is:

1. A method for forming pistons comprising the steps of mounting the piston workpiece for rotation about an eccentric axis of rotation, forming the outer periphery of the face of the piston to a finished surface, simultaneously cutting the central portion of the piston with a polyfaced cutting tool portion, and thereafter cutting the central portion of the tool to a finished dimension.

2. The process in accordance with claim 1 including the step of simultaneously forming a concave recess in the outer periphery of the piston face and advancing the tool toward the center of the piston to effect a preliminary trimming of the central portion of the piston and a subsequent finishing operation with the same tool portion which effect the concave recessing in the piston face.

References Cited

UNITED STATES PATENTS

| | | | |
|---|---|---|---|
| 587,477 | 8/1897 | Doolittle | 82—1X |
| 1,286,309 | 12/1918 | Hawley | 82—1 |
| 1,821,743 | 9/1931 | Dreyhaupt | 82—1 |
| 1,834,716 | 12/1931 | Kis | 82—1 |
| 2,569,873 | 10/1951 | Stacey | 82—1X |

FOREIGN PATENTS

| | | | |
|---|---|---|---|
| 665—928 | 7/1963 | Canada | 82—1 |

HARRISON L. HINSON, Primary Examiner

U.S. Cl. X.R.

29—97